United States Patent
Li et al.

(10) Patent No.: US 12,517,476 B2
(45) Date of Patent: Jan. 6, 2026

(54) METHOD AND DEVICE FOR INTELLIGENT CONTROL OF HEATING FURNACE COMBUSTION BASED ON A BIG DATA CLOUD PLATFORM

(71) Applicant: University of Science and Technology Beijing, Beijing (CN)

(72) Inventors: Qing Li, Beijing (CN); Fengqin Lin, Beijing (CN); Hui Li, Beijing (CN); Li Wang, Beijing (CN); Chengyong Xiao, Beijing (CN); Xu Yang, Beijing (CN); Jiarui Cui, Beijing (CN); Chunqiu Wan, Beijing (CN); Qun Yan, Beijing (CN); Yan Liu, Beijing (CN); Lei Miao, Beijing (CN); Jin Guo, Beijing (CN); Boyu Zhang, Beijing (CN); Chen Huang, Beijing (CN); Yaming Xi, Beijing (CN); Yuxuan Lin, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 383 days.

(21) Appl. No.: 18/462,445

(22) Filed: Sep. 7, 2023

(65) Prior Publication Data
US 2024/0085866 A1 Mar. 14, 2024

(51) Int. Cl.
G05B 13/04 (2006.01)

(52) U.S. Cl.
CPC .................. *G05B 13/041* (2013.01)

(58) Field of Classification Search
CPC .............................. F27D 19/00; G05B 13/041
See application file for complete search history.

(56) References Cited

U.S. PATENT DOCUMENTS

| | | | |
|---|---|---|---|
| 2015/0260398 A1* | 9/2015 | Sun | F23N 5/006 110/341 |
| 2018/0210436 A1* | 7/2018 | Burd | G05B 19/41885 |
| 2019/0114549 A1 | 4/2019 | Olsher | |
| 2022/0083046 A1 | 3/2022 | Cella et al. | |
| 2022/0308903 A1* | 9/2022 | Chakraborty | G06F 3/04817 |
| 2023/0246437 A1 | 8/2023 | Cella et al. | |
| 2023/0359155 A1* | 11/2023 | Schockaert | G06N 3/09 |

FOREIGN PATENT DOCUMENTS

| | | | |
|---|---|---|---|
| CN | 102169326 A | 8/2011 | |
| CN | 106636606 A | 5/2017 | |
| CN | 108644805 A | * 10/2018 | F23N 5/00 |

* cited by examiner

*Primary Examiner* — Vincent H Tran
(74) *Attorney, Agent, or Firm* — True Shepherd LLC; Andrew C. Cheng

(57) ABSTRACT

The present disclosure provides a method and device for intelligent control of heating furnace combustion based on a big data cloud platform, which relates to the technical field of artificial intelligence control. The method includes: construction of big data cloud platform based on production and operation parameters of the heating furnace; identification of key factors in the production process of the heating furnace by using big data mining technology; independent deployment of traditional heating furnace combustion control systems based on the mechanism model; and integration of cloud platform big data expert knowledge base and the heating furnace combustion intelligent control system.

6 Claims, 13 Drawing Sheets

(a) Soaking section (b) Heating section

METHOD AND DEVICE FOR INTELLIGENT CONTROL OF HEATING FURNACE COMBUSTION BASED ON A BIG DATA CLOUD PLATFORM

CROSS-REFERENCE TO RELATED APPLICATIONS

This application claims the priority to Chinese Patent Application No. 202211115824.4, filed with the China National Intellectual Property Administration on Sep. 14, 2022 and entitled "method and device for intelligent control of heating furnace combustion based on a big data cloud platform", which is incorporated into the present application by reference in its entirety.

TECHNICAL FIELD

The present disclosure relates to the technical field of artificial intelligence control, and more particularly to a method and device for intelligent control of heating furnace combustion based on a big data cloud platform.

BACKGROUND

With the continuous promotion of intelligent manufacturing to the steel industry, various process links have ushered in the spring of technological innovation. The introduction of cutting-edge concepts and technologies will undoubtedly create a new era in the steel manufacturing industry. As an important link in the steel process industry, the main purpose of the heating furnace is to heat and homogenize the upstream raw materials, such that they have better thermal characteristics to meet the requirements of downstream production processes. For a long time, due to the high temperature and dust environment of the heating furnace, as well as the numerous and tightly coupled factors that affect its control effect, the automation level of the heating furnace control system is lower than other links in the production line. In addition, the heating furnace is also a major energy consumer in the production line, and improving the intelligent level of the heating furnace control system will bring huge economic and social benefits.

SUMMARY

In view of the problem that the heating furnace has high energy consumption, and improvement of the intelligent level of the heating furnace control system will bring huge economic and social benefits, the present disclosure provides a method and device for intelligent control of heating furnace combustion based on a big data cloud platform.

To solve the above technical problems, the present disclosure provides the following technical solution.

In one aspect, a method for intelligent control of heating furnace combustion based on a big data cloud platform is provided, the method is applicable to an electronic device, and the method includes:

S1: building the big data cloud platform based on production and operation parameters of a heating furnace;

S2: identifying and analyzing key factors in a production process of the heating furnace, by using big data mining technology, based on the big data cloud platform, to obtain a relevant data knowledge base and a big data decision-making knowledge base;

S3: deploying independently a heating furnace combustion control system based on a mechanism model;

S4: integrating the heating furnace combustion control system based on the mechanism model with the big data cloud platform, and completing the intelligent control of heating furnace combustion based on the big data cloud platform.

Optionally, the step S1 of building the big data cloud platform based on the production and operation parameters of the heating furnace includes:

designing hardware equipment, parameters, and division of labor of the big data cloud platform based on analysis of data storage, access concurrency, heating furnace expert knowledge base, and factors related to calculation demand in a process of model base research and development.

The big data cloud platform adopts a three-layer architecture, with a bottom layer being an infrastructure layer, a middle layer being a support layer, and a top layer being a knowledge base service layer.

Optionally, the infrastructure layer of the big data cloud platform is configured for hardware resource virtualization and management services, the support layer of the big data cloud platform is configured to provide support for collection, storage, mining, analysis, and visual research and development of parameters during operation of the production process of the heating furnace, the knowledge base service layer is configured to store the key factors of the production process of the heating furnace.

Optionally, the step S2 of identifying and analyzing the key factors in the production process of the heating furnace, by using the big data mining technology, based on the big data cloud platform, to obtain the relevant data knowledge base and the big data decision-making knowledge base includes:

S21: identifying the key factors in the production process of the heating furnace, by using the big data mining technology, based on the big data cloud platform, to obtain the relevant data knowledge base;

S22: mining an association map of each operating parameter, by intelligent analysis of big data, based on artificial intelligence, machine learning and mode learning methods preset by a parameter data center during operation of the heating furnace, to obtain the big data decision-making knowledge base.

Optionally, the step S21 of obtaining the relevant data knowledge base includes:

obtaining a knowledge base of working and furnace conditions, including: for different planned mixed assembly, according to different heating sections, and based on steel type, position weight, vacancy layout, target temperature, current temperature, predicted section temperature, weighing a heating system of different slabs, and perceiving furnace and working condition state parameters of the heating furnace for overall planning, to obtain the knowledge base of working and furnace conditions;

obtaining an accuracy evaluation knowledge base for a plate temperature prediction model, including: dynamically evaluating prediction accuracy data of a temperature inside a furnace of each grade for adaptive adjustment of an intelligent combustion model, and synthesizing the prediction accuracy data to obtain the accuracy evaluation knowledge base for the plate temperature prediction model;

obtaining a knowledge base for energy efficiency evaluation of the heating furnace, including: based on production data, energy data and furnace conditions, forming objective evaluation data of the heating furnace, and synthesizing the objective evaluation data to obtain the knowledge base for energy efficiency evaluation of the heating furnace;

obtaining a knowledge base for furnace pressure discrimination, including: according to a standard that a priority of furnace pressure control is higher than that of furnace temperature control, controlling an outlet side of the heating furnace to be in a micro-positive pressure state, and synthesizing control standard data and micro-positive pressure state data, to obtain the knowledge base for furnace pressure discrimination;

obtaining a knowledge base for air-fuel ratio optimization, including: setting a reasonable air-fuel ratio, determining a control accuracy of furnace temperature and a control accuracy of atmosphere in each heating section, to obtain the knowledge base for air-fuel ratio optimization.

Optionally, the step S22 of obtaining the big data decision-making knowledge base, including:

obtaining a heating target decision-making knowledge base, including: describing a heating target specified by each heating furnace through a furnace outlet temperature and a Rolling Delivery Temperature (RDT), to obtain the heating target decision-making knowledge base;

obtaining a heating system decision-making knowledge base, including: making statistics on heating curves under various working conditions, and obtaining the heating system decision-making knowledge base.

Optionally, the step S3 of deploying independently the heating furnace combustion control system based on the mechanism model including:

S31: tracking and correcting material of the heating furnace, corresponding a rolling plan with an actual slab one by one, determining a tracking position, and traversing a slab flow direction, and making tracking correction;

S32: predicting a temperature rise process of the slab in the heating furnace, and predicting a temperature distribution of the slab at each time section in the heating furnace by using a mathematical model. The slab temperature control equation is shown in formula (1):

$$\rho(t)Cp(t)\frac{\partial t}{\partial \tau} = \frac{\partial}{\partial x}\left[\lambda(t)\frac{\partial t}{\partial x}\right] + \frac{\partial}{\partial y}\left[\lambda(t)\frac{\partial t}{\partial y}\right] \quad (1)$$

$\rho(t)$ indicates a density of the slab; $Cp(t)$ indicates a specific heat of the slab; $\lambda(t)$ indicates a thermal conductivity of the slab;

S33: establishing a furnace temperature optimization model based on the slab temperature control equation.

Optionally, the step S33 of establishing the furnace temperature optimization model based on the slab temperature control equation including:

S331: performing offline optimization based on the slab temperature control equation, and establishing a basic furnace temperature table, namely a furnace temperature carpet map;

S332: performing online dynamic optimization based on the slab temperature control equation, based on a heating process and production rhythm, simulating a temperature rise process of the slab, and calculating a necessary furnace temperature required by a target heating process;

S333: synthesizing the furnace temperature, giving different weight values to each slab, and obtaining the furnace temperature optimization model based on online optimization of a furnace temperature of each slab, in which with a position of each slab in a furnace section and a target temperature being different, the weight value within each slab also being different.

Optionally, the step S4 of integrating the heating furnace combustion control system based on the mechanism model with the big data cloud platform, and completing the intelligent control of heating furnace combustion based on the big data cloud platform including:

integrating the heating furnace combustion control system based on the mechanism model with the big data cloud platform, the big data cloud platform establishing a synchronous data image in the heating furnace according to data collection information, continuously iteratively updating each knowledge decision-making database, synthesizing information of each knowledge base, and sending process and time control parameters to the furnace combustion control system in real time through an Application Programming Interface (API) function, and completing the intelligent control of heating furnace combustion based on the big data cloud platform.

In another aspect, a device for intelligent control of heating furnace combustion based on a big data cloud platform, the device is applicable to an electronic device, the device includes:

a platform building module, configured to build the big data cloud platform based on production and operation parameters of a heating furnace;

a knowledge base construction module, configured to identify and analyze key factors in a production process of the heating furnace, by using big data mining technology, based on the big data cloud platform, to obtain a relevant data knowledge base and a big data decision-making knowledge base;

a model deployment module, configured to deploy independently a heating furnace combustion control system based on a mechanism model;

an intelligent control module, configured to integrate the heating furnace combustion control system based on the mechanism model with the big data cloud platform, and complete the intelligent control of heating furnace combustion based on the big data cloud platform.

In another aspect, an electronic device is provided. The electronic device includes a processor and a memory, in which at least one instruction is stored. The at least one instruction is loaded and executed by the processor to realize the method for intelligent control of heating furnace combustion based on a big data cloud platform.

In yet another aspect, a computer-readable storage medium is provided, in which at least one instruction is stored, and the at least one instruction is loaded and executed by the processor to realize the method for intelligent control of heating furnace combustion based on a big data cloud platform.

BRIEF DESCRIPTION OF THE DRAWINGS

In order to provide a clearer explanation of the technical solution in the embodiments of the present disclosure, a brief introduction will be given to the accompanying drawings required in the description of the embodiments. It is evident that the accompanying drawings in the following description are only some embodiments of the present invention. For those skilled in the art, other accompanying drawings can be obtained based on these drawings without any creative effort.

DETAILED DESCRIPTION

In order to clarify the technical problems, solutions, and advantages to be solved by the present invention, a detailed description will be given below in conjunction with the accompanying drawings and specific embodiments.

Figure 1:
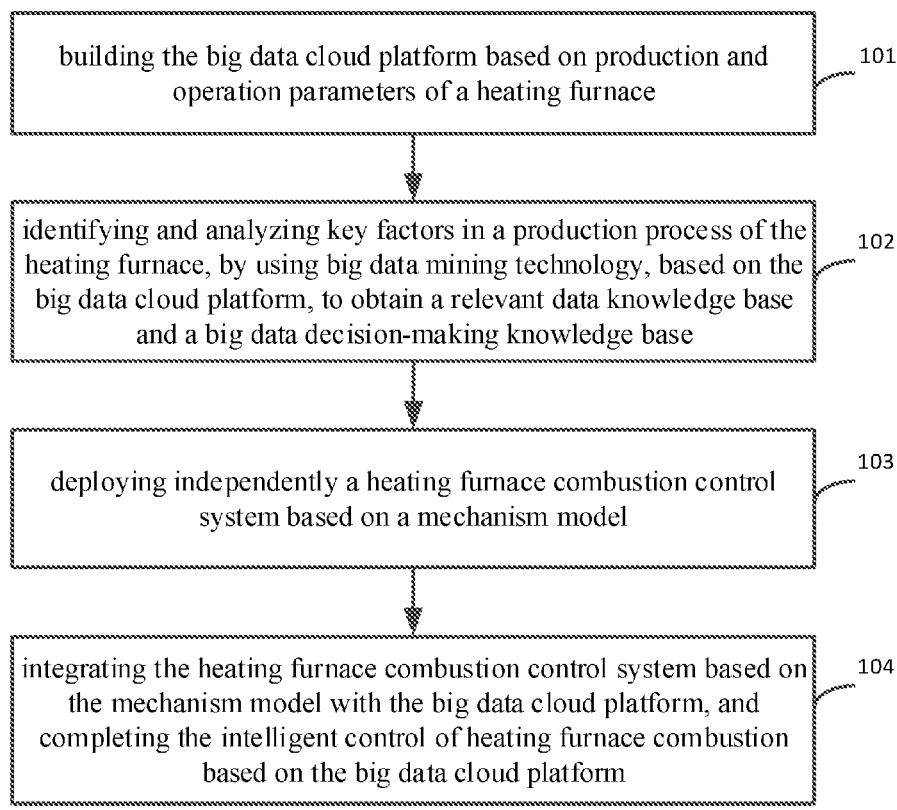
FIG. 1 is a flow chart of a method for intelligent control of heating furnace combustion based on a big data cloud platform according to an embodiment of the present disclosure.

Embodiments of the present disclosure provides a method for intelligent control of heating furnace combustion based on a big data cloud platform, the method can be realized by an electronic device, the electronic device can be a terminal or a server. The method for intelligent control of heating furnace combustion based on a big data cloud platform as shown in FIG. 1 can includes the following steps.

At block S101, a big data cloud platform is built based on production and operation parameters of a heating furnace.

At block S102, by using big data mining technology, based on the big data cloud platform, key factors in a production process of the heating furnace are identified and analyzed, to obtain a relevant data knowledge base and a big data decision-making knowledge base.

At block S103, a heating furnace combustion control system is deployed independently based on a mechanism model.

At block S104, the heating furnace combustion control system based on the mechanism model is integrated with the big data cloud platform, and the intelligent control of heating furnace combustion based on the big data cloud platform is completed.

Optionally, the step S101 of building the big data cloud platform based on the production and operation parameters of the heating furnace includes:
designing hardware equipment, parameters, and division of labor of the big data cloud platform based on analysis of data storage, access concurrency, heating furnace expert knowledge base, and factors related to calculation demand in a process of model base research and development.

The big data cloud platform adopts a three-layer architecture, with a bottom layer being an infrastructure layer, a middle layer being a support layer, and a top layer being a knowledge base service layer.

Optionally, the infrastructure layer of the big data cloud platform is configured for hardware resource virtualization and management services, the support layer of the big data cloud platform is configured to provide support for collection, storage, mining, analysis, and visual research and development of parameters during operation of the production process of the heating furnace, the knowledge base service layer is configured to store the key factors of the production process of the heating furnace.

Optionally, the step S102 of identifying and analyzing the key factors in the production process of the heating furnace, by using the big data mining technology, based on the big data cloud platform, to obtain the relevant data knowledge base and the big data decision-making knowledge base includes:

S121, identifying the key factors in the production process of the heating furnace, by using the big data mining technology, based on the big data cloud platform, to obtain the relevant data knowledge base;

S122, mining an association map of each operating parameter, by intelligent analysis of big data, based on artificial intelligence, machine learning and mode learning methods preset by a parameter data center during operation of the heating furnace, to obtain the big data decision-making knowledge base.

Optionally, the step S121 of obtaining the relevant data knowledge base includes:
obtaining a knowledge base of working and furnace conditions, including: for different planned mixed assembly, according to different heating sections, and based on steel type, position weight, vacancy layout, target temperature, current temperature, predicted section temperature, weighing a heating system of different slabs, and perceiving furnace and working condition state parameters of the heating furnace for overall planning, to obtain the knowledge base of working and furnace conditions;

obtaining an accuracy evaluation knowledge base for a plate temperature prediction model, including: dynamically evaluating prediction accuracy data of a temperature inside a furnace of each grade for adaptive adjustment of an intelligent combustion model, and synthesizing the prediction accuracy data to obtain the accuracy evaluation knowledge base for the plate temperature prediction model;

obtaining a knowledge base for energy efficiency evaluation of the heating furnace, including: based on production data, energy data and furnace conditions, forming objective evaluation data of the heating furnace, and synthesizing the objective evaluation data to obtain the knowledge base for energy efficiency evaluation of the heating furnace;

obtaining a knowledge base for furnace pressure discrimination, including: according to a standard that a priority of furnace pressure control is higher than that of furnace temperature control, controlling an outlet side of the heating furnace to be in a micro-positive pressure state, and synthesizing control standard data and micro-positive pressure state data, to obtain the knowledge base for furnace pressure discrimination;

obtaining a knowledge base for air-fuel ratio optimization, including: setting a reasonable air-fuel ratio, determining a control accuracy of furnace temperature and a control accuracy of atmosphere in each heating section, to obtain the knowledge base for air-fuel ratio optimization.

Optionally, the step S122 of obtaining the big data decision-making knowledge base, including:

obtaining a heating target decision-making knowledge base, including: describing a heating target specified by each heating furnace through a furnace outlet temperature and a RDT, to obtain the heating target decision-making knowledge base;

obtaining a heating system decision-making knowledge base, including: making statistics on heating curves under various working conditions, and obtaining the heating system decision-making knowledge base.

Optionally, the step S103 of deploying independently the heating furnace combustion control system based on the mechanism model including:

S131, tracking and correcting material of the heating furnace, corresponding a rolling plan with an actual slab one by one, determining a tracking position, and traversing a slab flow direction, and making tracking correction;

S132, predicting a temperature rise process of the slab in the heating furnace, and predicting a temperature distribution of the slab at each time section in the heating furnace by using a mathematical model. The slab temperature control equation is shown in formula (1):

$$\rho(t)Cp(t)\frac{\partial t}{\partial \tau} = \frac{\partial}{\partial x}\left[\lambda(t)\frac{\partial t}{\partial x}\right] + \frac{\partial}{\partial y}\left[\lambda(t)\frac{\partial t}{\partial y}\right] \quad (1)$$

In which $\rho(t)$ indicates a density of the slab; $Cp(t)$ indicates a specific heat of the slab; $\lambda(t)$ indicates a thermal conductivity of the slab;

S133: establishing a furnace temperature optimization model based on the slab temperature control equation.

Optionally, the step S133 of establishing the furnace temperature optimization model based on the slab temperature control equation including:

S1331, performing offline optimization based on the slab temperature control equation, and establishing a basic furnace temperature table, namely a furnace temperature carpet map;

S1332, performing online dynamic optimization based on the slab temperature control equation, based on a heating process and production rhythm, simulating a temperature rise process of the slab, and calculating a necessary furnace temperature required by a target heating process;

S1333, synthesizing the furnace temperature, giving different weight values to each slab, and obtaining the furnace temperature optimization model based on online optimization of a furnace temperature of each slab, in which with a position of each slab in a furnace section being different and a target temperature being different, the weight value within each slab also being different.

Optionally, the step S104 of integrating the heating furnace combustion control system based on the mechanism model with the big data cloud platform, and completing the intelligent control of heating furnace combustion based on the big data cloud platform including:

integrating the heating furnace combustion control system based on the mechanism model with the big data cloud platform, the big data cloud platform establishing a synchronous data image in the heating furnace according to data collection information, continuously iteratively updating each knowledge decision-making database, synthesizing information of each knowledge base, and sending process and time control parameters to the furnace combustion control system in real time through an API function, and completing the intelligent control of heating furnace combustion based on the big data cloud platform.

In embodiments of the present disclosure, by the method for intelligent control of heating furnace combustion based on a big data cloud platform provided by the present disclosure, a complete and independent relevant data knowledge base can be formed through artificial intelligence and big data technologies. Based on this knowledge base, the intelligent combustion model uses the mechanism model to calculate the optimal heating curve of the slab under current furnace conditions and working conditions, as well as the furnace temperature and even the air fuel ratio required to ensure the quality of the slab. It is then distributed to the original heating furnace system, thereby achieving intelligent control of heating furnace combustion.

Figure 2:
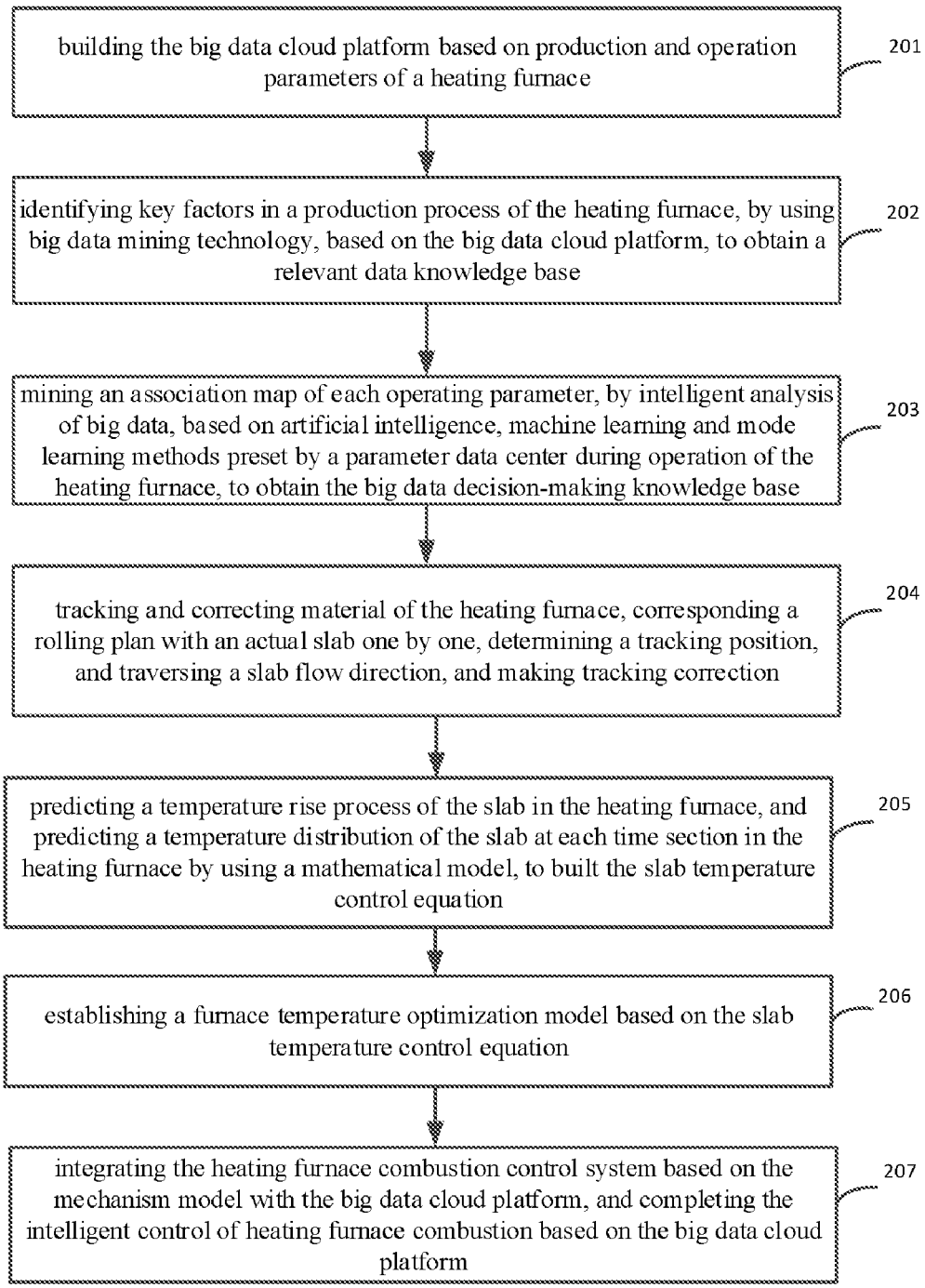
FIG. 2 is a flow chart of a method for intelligent control of heating furnace combustion based on a big data cloud platform according to another embodiment of the present disclosure.

Embodiments of the present disclosure provides a method for intelligent control of heating furnace combustion based on a big data cloud platform, the method can be realized by an electronic device, the electronic device can be a terminal or a server. The method for intelligent control of heating furnace combustion based on a big data cloud platform as shown in FIG. 2 can includes the following steps.

At block S201, a big data cloud platform is built based on production and operation parameters of the heating furnace.

In a feasible implementation embodiment, the big data cloud platform is built based on production and operation parameters of the heating furnace. The main hardware equipment, parameters, and division of labor of the big data cloud platform are designed based on analysis of data storage, access concurrency, heating furnace expert knowledge base, and factors related to calculation demand in a process of model base research and development. The hardware composition of the big data cloud platform is shown in Table 1:

operation of the production process of the heating furnace. The top layer of the big data cloud platform is configured to store the key factors of the production process of the heating furnace.

In a feasible implementation, the infrastructure layer of the big data cloud platform is built based on the OpenStack open-source platform, providing services such as hardware

TABLE 1 hardware composition of big data cloud platform

| Series | Name | Configuration parameter | Number | Function |
|---|---|---|---|---|
| 1 | Virtualization Server | Xeon E5-2640V4 * 2/8C/2.6 GHz, 8 × 16 GB DDR4 memory, 2-port Gigabit Ethernet port, DVD-RW optical drive, RAID 510i AnyRAID AdapterRAID card | 3 | Providing virtual machine computing and distributed storage |
| 2 | Cloud Management Server | 2 * Intel E5-2630 V3CPUs (6-core, 2.6 GHz); 4 * 16 GB DDR4 memory; 4 * 2 TB SATA hard drive; External SAS RAID card insertion; Integrated Intel dual gigabit network card | 2 | Providing hardware facility management services such as resource pools, virtual machines, and containers for cloud platforms |
| 3 | Operation and Maintenance Management Server | 2 * Intel E5-2630 V3CPUs (6-core, 2.6 GHz); 4 * 16 GB DDR4 memory; 4 * 2 TB SATA hard drive; External SAS RAID card insertion; Integrated Intel dual gigabit network card | 1 | Providing cloud platform operation and maintenance services such as automatic deployment, monitoring, and alarm |
| 4 | Heating Furnace Model Server | Windows Server 64 bit; 2 * Intel ® Xeon ® Silver 4114Processor * 2; 16 G RDIMM DDR4 2666 RAM * 4; 9361-8i 2 GB array card; 2.5-inch 480 G SATA SSD * 18 T 7.2K SATA 3.5-inch hot swappable hard drive * 2; Dual port 10 Gigabit Ethernet card * 1; 4-port Gigabit Ethernet card * 1 | 1 | Running intelligent control system for heating furnace combustion |
| 5 | Gigabit Switch | Gigabit 24 port managed switch backplane bandwidth 256 Gbps, packet forwarding rate 102 Mpps | 1 | Providing high-speed network communication for cloud platforms |
| 6 | KVM Switch | 17-inch LCD display (1280 * 1024), 16 ports | 1 | providing local management of servers |
| 7 | Desktop Computer | CPU: 15-6600 (4-core, 3.3 GHZ), memory: 8 GB, hard drive: 1 TB, 7200 RPM, SATA interface, display: 21.5 inches, 1920 × 1080, independent graphics card: AMD R7-350, DVD drive, Gigabit Ethernet card, USB mouse and keyboard | 3 | Providing development and testing terminals for cloud platforms |

Figure 3:
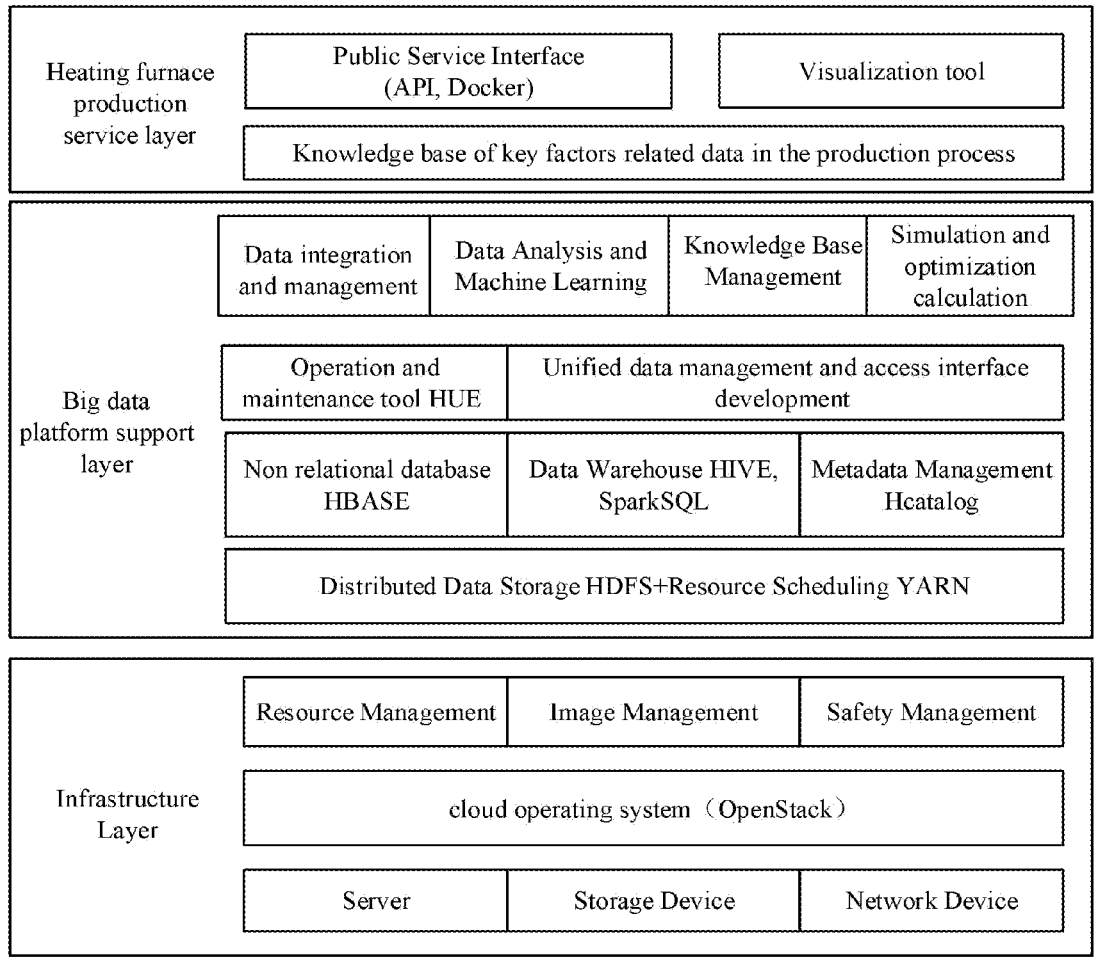
FIG. 3 is a schematic diagram illustrating a big data cloud platform architecture of the method for intelligent control of heating furnace combustion based on a big data cloud platform according to an embodiment of the present disclosure.

The big data cloud platform adopts a three-layer architecture. The bottom layer is an infrastructure layer, which is configured to provide hardware resource virtualization and management services of the cloud platform. The middle layer is the support layer, which is the research and development support platform for the collection, storage, mining analysis, visualization, and other aspects of the parameters during the production process of the heating furnace. The top layer is the knowledge base for storing key production factor relevant data in the production process of the heating furnace. The specific architecture is shown in FIG. 3.

In a feasible implementation, the infrastructure layer of the big data cloud platform is configured to provide hardware resource virtualization and management services. The support layer of the big data cloud platform is configured to provide support for collection, storage, mining, analysis, and visual research and development of parameters during resource virtualization management, VLAN, image management, distributed storage management, security authentication management, etc.

The support layer of the big data cloud platform is mainly built based on the Hadoop open-source platform, using Hadoop Distributed File System (HDFS) distributed storage to achieve the storage management of quality control industrial big data, and achieving resource scheduling management through Yet Another Resource Negotiator (YARN). The data management tool uses components such as HBASE, HIVE, and HCatalog to implement non-relational databases, data warehouses, and metadata management services, and develops relevant data access interfaces based on this. The support layer of the big data cloud platform also integrates data collection (Sqoop, Falcon, etc.), mining analysis (Mahout, Spark MLib, TensorFlow, etc.), knowledge base management tools, simulation and optimization computing tools (ANSYS, DEFORM, etc.), and visualization tools.

The production service layer of the heating furnace is mainly configured to provide knowledge query and sharing services for key factors in the production process through API interface technology, while for knowledge bases and toolsets developed on cloud platforms, they are downloaded through Docker container technology.

At block S102, by using big data mining technology, based on the big data cloud platform, key factors in the production process of the heating furnace are identified, to obtain the relevant data knowledge base.

In a feasible implementation, the key factors in the production process of the heating furnace are identified by using the big data mining technology, thereby forming the relevant data knowledge base. Based on artificial intelligence, machine learning and mode learning methods preset by a parameter data center during operation of the heating furnace, and by intelligent analysis of big data, the association map of each operating parameter is mined, thereby obtaining an independent and complete big data decision-making knowledge base.

In a feasible implementation, the relevant data of the heating furnace system is mainly from the PLC control system and the original L2 control system. Multiple protocols are used to connect the data collection with the above systems to achieve the barrier free transmission of the original data. The collection content includes the followings.

Furnace condition data: valve opening, valve adjustment mode (manual/automatic), valve status (whether it is involved in control), thermocouple status (whether it is involved in control), furnace pressure, exhaust gas temperature, etc.

Working condition data: gas/air pressure, gas/air flow rate, gas calorific value, air fuel ratio, production status (roll change, failure, waiting for temperature, waiting for rolling), etc.

Production data: raw material information of the slab (length, width, thickness, weight, steel grade, composition, etc.), heating curve of the slab in the furnace, temperature history curve of the slab in the furnace, loading and unloading time of the slab, entering and exiting time of each section of the slab, time of the slab in the furnace, RDT full length temperature curve, etc.

Process data: Heating process regulations executed for each product specification and operating condition.

In a feasible implementation, the relevant data knowledge base is obtained, which includes the followings.

The knowledge base of working and furnace conditions is obtained, which includes: for different planned mixed assembly, according to different heating sections, and based on steel type, position weight, vacancy layout, target temperature, current temperature, predicted section temperature, weighing a heating system of different slabs, and perceiving furnace and working condition state parameters of the heating furnace for overall planning, to obtain the knowledge base of working and furnace conditions. All operation parameters are related to the current furnace conditions and operating conditions, which includes the followings.

Billet identification for roll change: change of plan number, rolling mileage greater than the threshold, hot roll billet before and after roll change, change of steel type code, wear of roll before roll change, rolling width gradually reduced, and new Coil width after roll change being generally not lower than the previous plan.

Transition material identification: when the steel types and specifications of the front and rear rolled products change, the target furnace temperature of the slab generally also changes. Hot roll billet: 3 pieces, 1 piece per furnace; rolling transition material: 9-12 pieces, 3-4 pieces per furnace; temperature transition material: target temperature transition after being released from the furnace may be in one batch or more.

Product specification mixed loading: by identifying the steel grade and specifications of the slabs in each control section (some sections are 1-2 slabs in advance), the amplitude and direction of changes in the required temperature of the slabs before and after being discharged are determined, and different levels are set. Different heating weight coefficients are assigned to each slab based on the relative position of the switching billet within the segment (such as in advance, before the section, during the section, after the section, etc.).

Cold and hot mixed loading: the furnace entry temperature of the slabs in each control section (some sections are advanced by 1 to 2 slabs) is identified, the position and switching mode (cold heat exchange and hot cold exchange) of the cold and hot switch slabs is determined, and heating weight coefficients are assigned to each slab based on the relative position of the switching billets in the section (such as advance, before section, in section, after section, etc.).

Production rhythm prediction: accurate production rhythm prediction knowledge base is the key to predict the remaining time of the slab in the furnace. The main related factors include: rolling capacity, for determining the fastest production rhythm based on different steel grades, rolling passes, and rolling speeds of the rolling line; minimum in-furnace time: for steel grades with minimum in furnace time process requirements, if the in-furnace time is not enough, it is necessary to reduce the tapping rhythm or stop the furnace for heating in advance.

In a feasible implementation, the accuracy evaluation knowledge base for the plate temperature prediction model is obtained, including: dynamically evaluating prediction accuracy data of the temperature inside the furnace of each grade for adaptive adjustment of the intelligent combustion model. The heat transfer coefficient and other parameters of the plate temperature prediction model drift over time with changes in furnace conditions, resulting in a decrease in the accuracy of the model.

Figure 4:
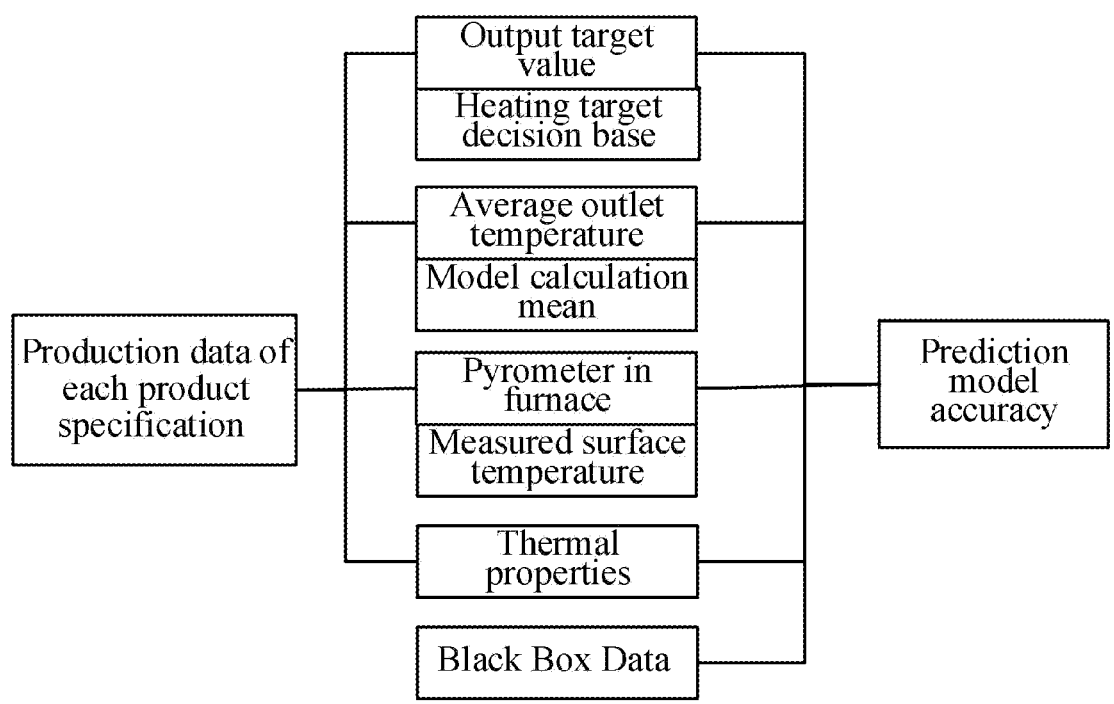
FIG. 4 is a schematic diagram illustrating an accuracy evaluation knowledge base for a plate temperature prediction model of the method for intelligent control of heating furnace combustion based on a big data cloud platform according to an embodiment of the present disclosure.

The model accuracy evaluation knowledge base dynamically evaluates the prediction accuracy of the temperature inside the furnace for each product specification, providing adaptive adjustment for the intelligent combustion model to ensure the accuracy of plate temperature prediction. The parameter graph is shown in FIG. 4.

Figure 5:
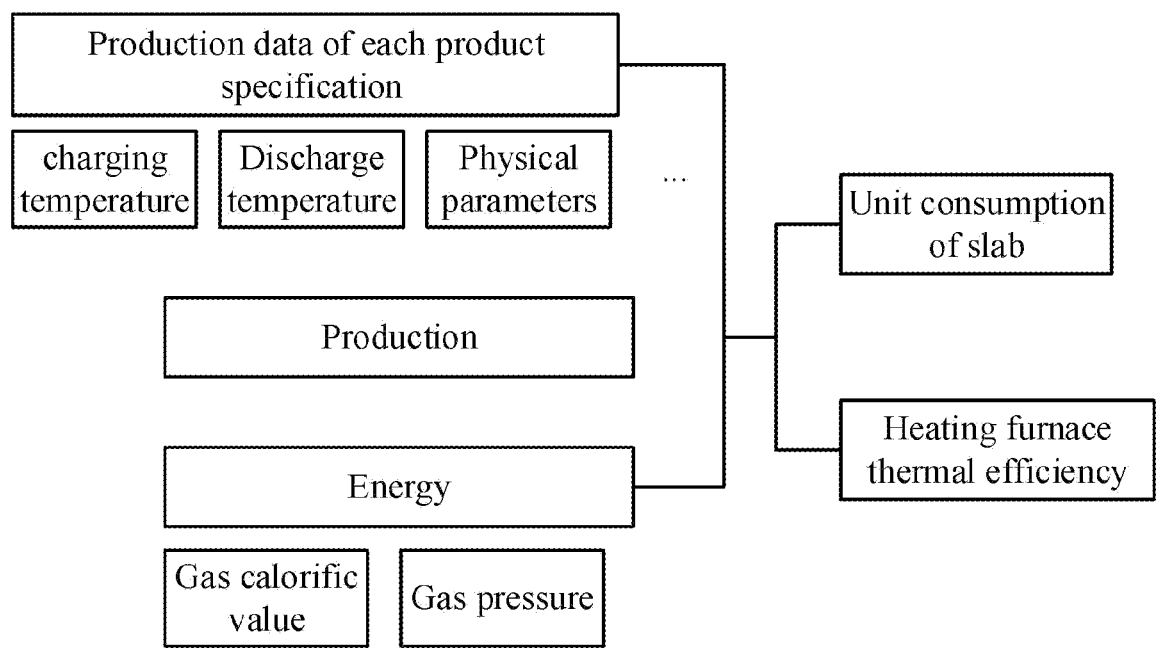
FIG. 5 is a schematic diagram illustrating a knowledge base for energy efficiency evaluation of the heating furnace of the method for intelligent control of heating furnace combustion based on a big data cloud platform according to an embodiment of the present disclosure.

In a feasible implementation, the knowledge base for energy efficiency evaluation of the heating furnace is obtained, which includes: based on production data, energy data and furnace conditions, forming objective evaluation data of the heating furnace, and synthesizing the objective evaluation data. The parameter map is shown in FIG. 5.

Figure 6:
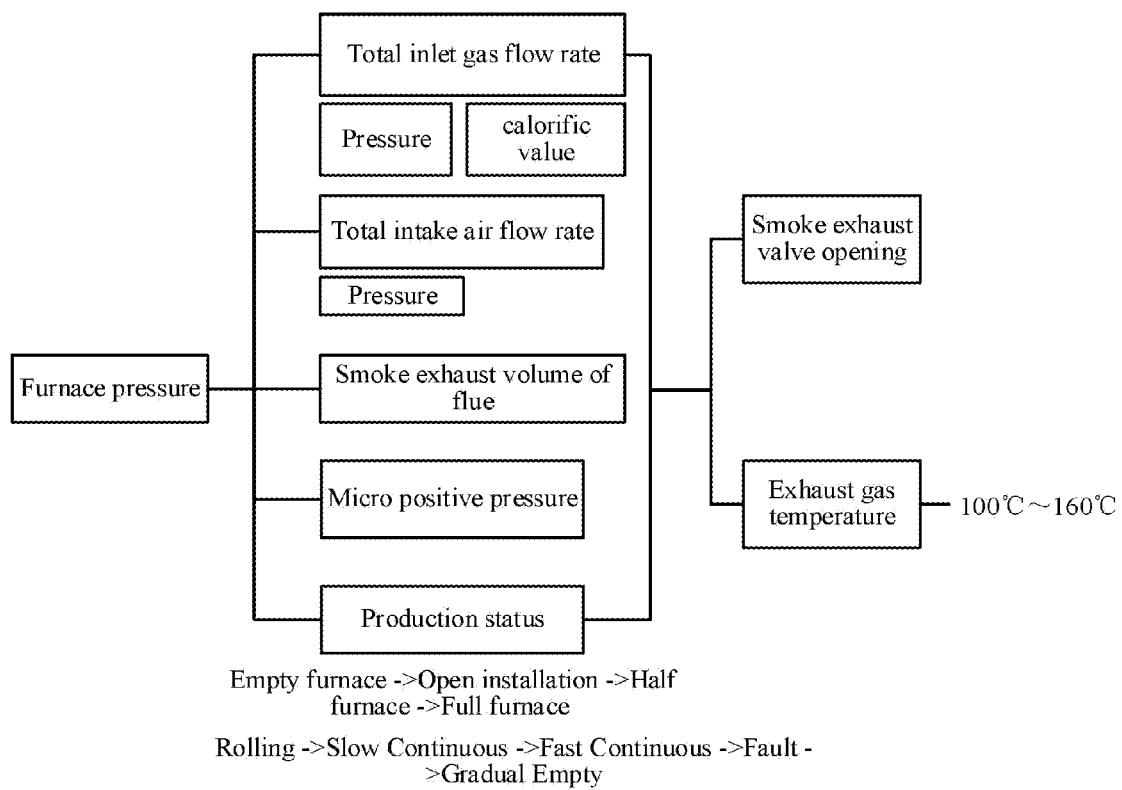
FIG. 6 is a schematic diagram illustrating a knowledge base for furnace pressure discrimination of the method for intelligent control of heating furnace combustion based on a big data cloud platform according to an embodiment of the present disclosure.

In a feasible implementation, the knowledge base for furnace pressure discrimination is obtained, which includes: according to a standard that a priority of furnace pressure control is higher than that of furnace temperature control, controlling an outlet side of the heating furnace to be in a micro-positive pressure state. The parameter map is shown in FIG. 6.

Figure 7:
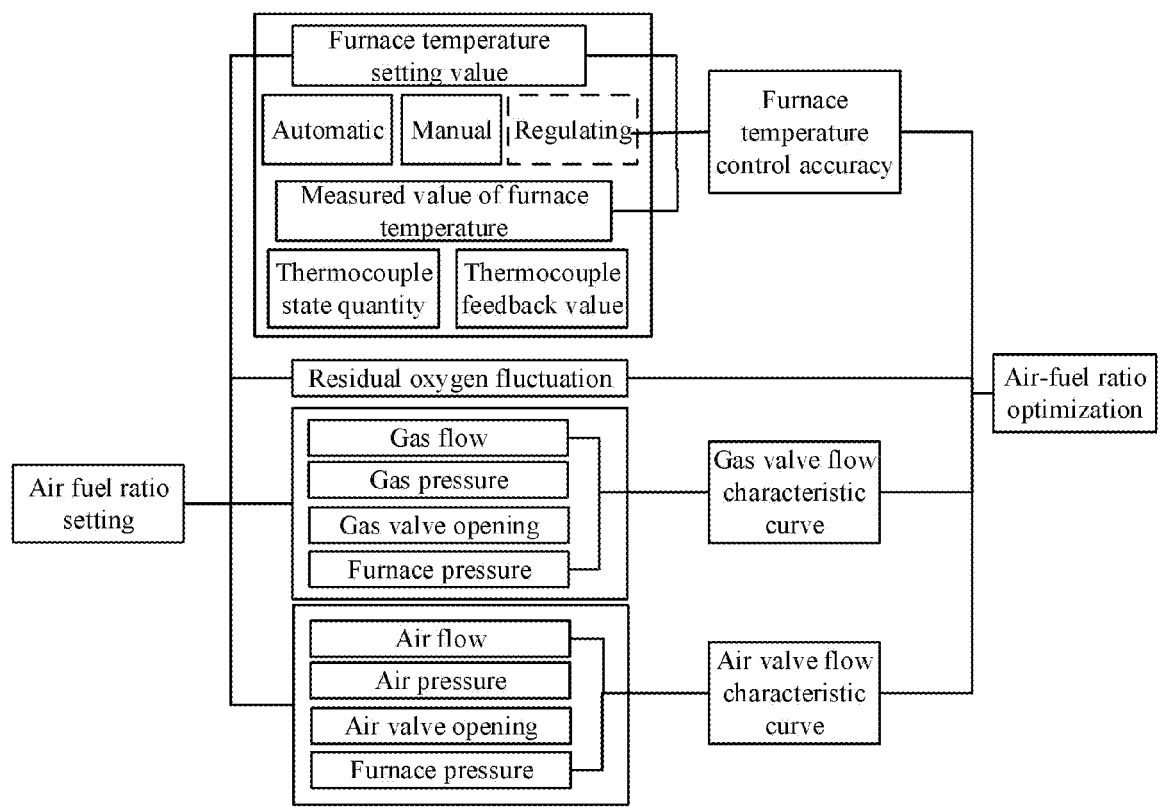
FIG. 7 is a schematic diagram illustrating a knowledge base for air-fuel ratio optimization of the method for intelligent control of heating furnace combustion based on a big data cloud platform according to an embodiment of the present disclosure.

In a feasible implementation, the knowledge base for air-fuel ratio optimization is obtained, which includes: setting a reasonable air-fuel ratio, and determining a control accuracy of furnace temperature and a control accuracy of atmosphere in each heating section. The parameter map is shown in FIG. 7.

At block S203, by intelligent analysis of big data, based on artificial intelligence, machine learning and mode learning methods preset by a parameter data center during operation of the heating furnace, the association map of each operating parameter is mined to obtain the big data decision-making knowledge base.

Figure 8:
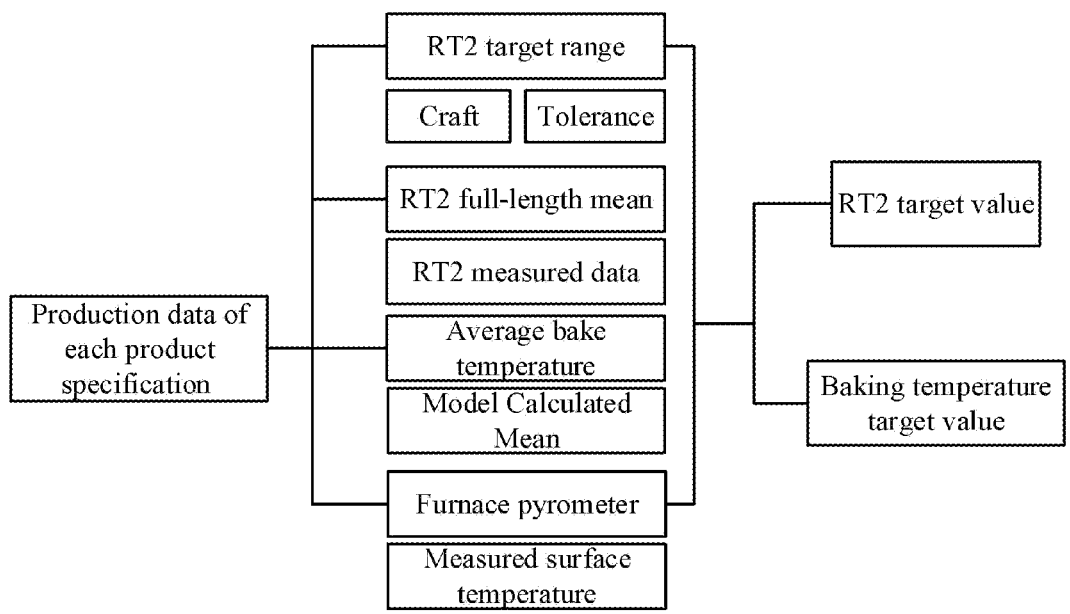
FIG. 8 is a schematic diagram illustrating a heating target decision-making knowledge base of the method for intelligent control of heating furnace combustion based on a big data cloud platform according to an embodiment of the present disclosure.
Figure 9:
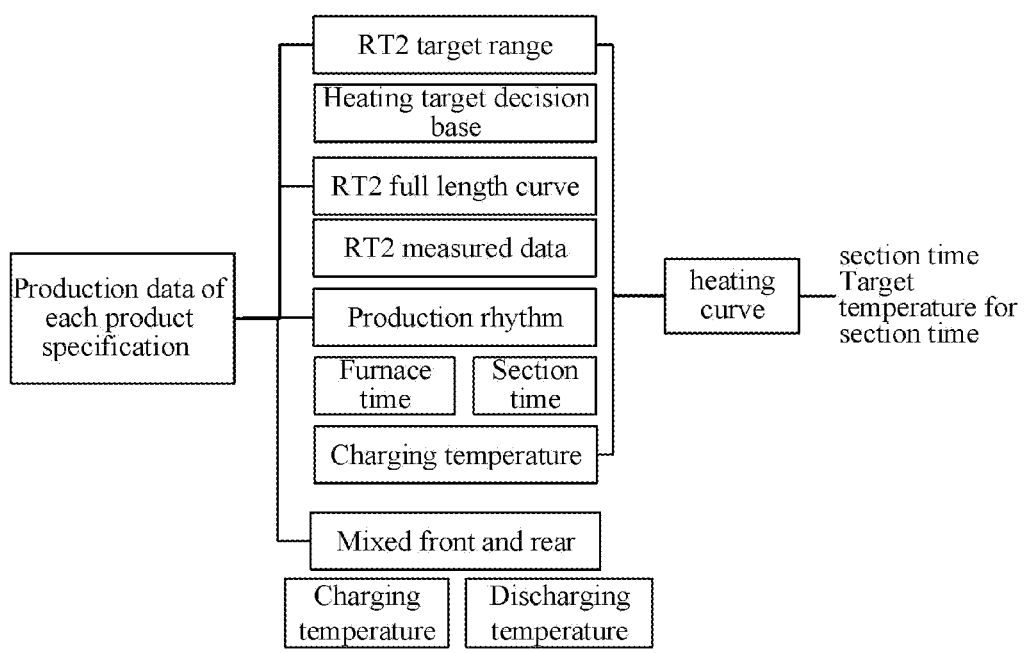
FIG. 9 is a schematic diagram illustrating a heating system decision-making knowledge base of the method for intelligent control of heating furnace combustion based on a big data cloud platform according to an embodiment of the present disclosure.

In a feasible implementation, obtaining the big data decision-making knowledge base, including:

obtaining a heating target decision-making knowledge base, including: describing a heating target specified by each heating furnace through a furnace outlet temperature and a RDT. The heating target of the slab is usually described by the furnace temperature and RDT, while due to the limited measurement means, the target temperature of the furnace is often calculated according to the RDT. This knowledge base is to clarify the heating target of each specification. The parameter map is shown in FIG. 8.

obtaining a heating system decision-making knowledge base, including: making statistics on heating curves under various working conditions. The optimal heating curve of each product specification is related to many factors, and the determination of the optimal heating curve is the premise of realizing the intelligent control of furnace temperature. The rationality of the heating curve of each product specification under each working condition is directly reflected in the heating quality of the slab. The parameter map is shown in FIG. 9.

At block S204, material of the heating furnace is tracked and corrected, the rolling plan is corresponded with the actual slab one by one, the tracking position is determined, and the slab flow direction is traversed, and tracking correction is made.

Figure 10:
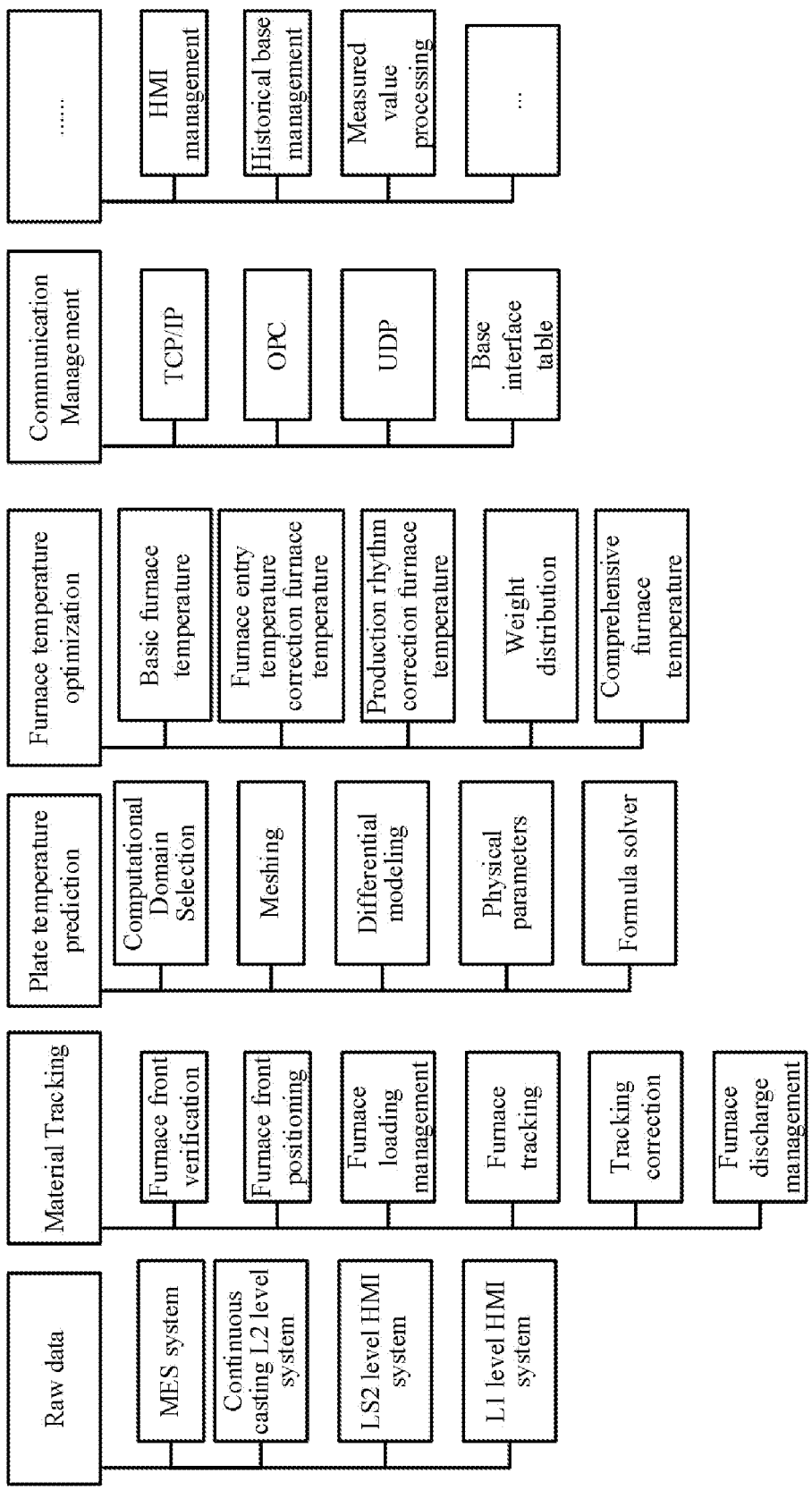
FIG. 10 is a schematic diagram illustrating functional module of traditional heating furnace combustion control system of the method for intelligent control of heating furnace combustion based on a big data cloud platform according to an embodiment of the present disclosure.
Figure 11:
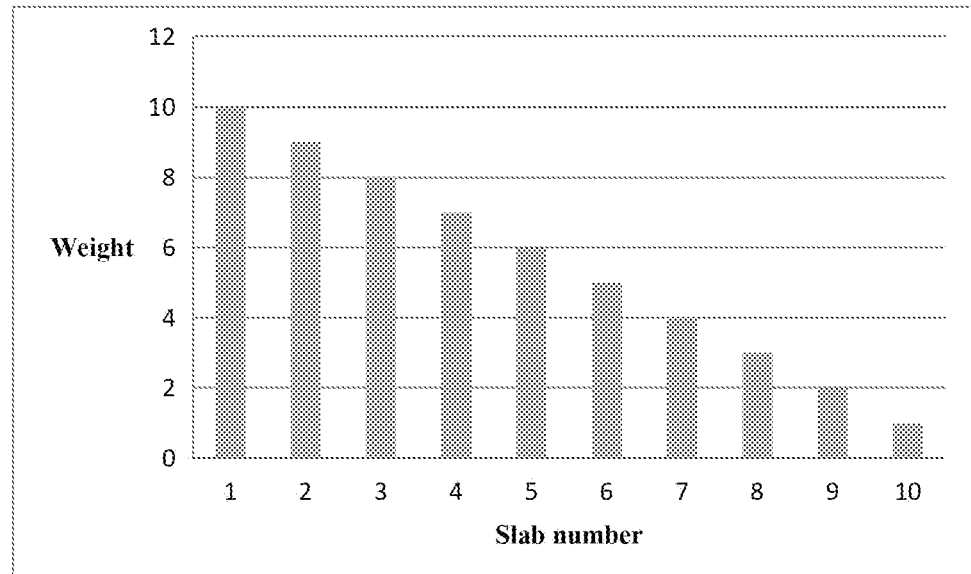
FIG. 11 is a schematic diagram illustrating a weight distribution of each section of the method for intelligent control of heating furnace combustion based on a big data cloud platform according to an embodiment of the present disclosure.
Figure 11:
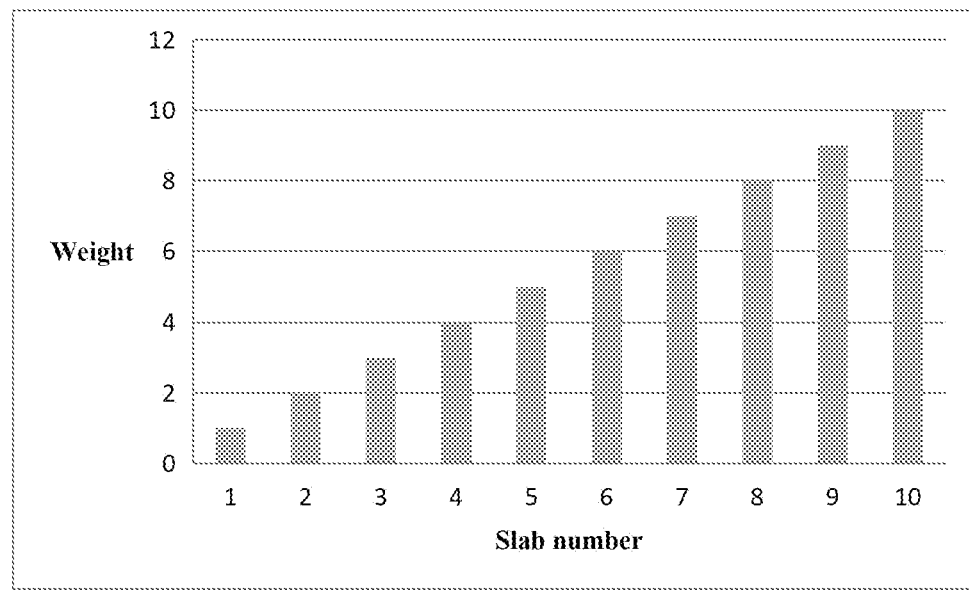

In the implementation of the present disclosure, the main function of the heating furnace process control system is to achieve optimal control with the slab temperature as the control target through modules such as slab logistics tracking, temperature tracking, and furnace temperature optimization setting, such that the slab can be heated to the target discharge temperature with the optimal heating curve, while reducing energy consumption and burning loss. The system functional modules are shown in FIG. 10.

In a feasible implementation, the tracking logic of the heating furnace material is complex, and since there are many possibilities of the direction of the slab, it is required that the detection signal be accurate and reliable, and assist the necessary tracking correction function. It will correspond the rolling plan with the actual slab one by one, track its position accurately, and provide entry parameters for the mathematical model. It will take over the slab data of continuous casting and MES, and transmit it to the downstream process. It will comprehensively verify the L1 level detection signal, to generate a reliable logic trigger signal. It provides a wealth of correction functions, traversing all possible slab flow direction.

At block S205, the temperature rise process of the slab in the heating furnace is predicted, the temperature distribution of the slab at each time section in the heating furnace is predicted by using the mathematical model. The slab temperature control equation is shown in formula (1).

$$\rho(t)Cp(t)\frac{\partial t}{\partial \tau} = \frac{\partial}{\partial x}\left[\lambda(t)\frac{\partial t}{\partial x}\right] + \frac{\partial}{\partial y}\left[\lambda(t)\frac{\partial t}{\partial y}\right] \quad (1)$$

$\rho(t)$ indicates a density of the slab, the unit is Kg/m3; $Cp(t)$ indicates a specific heat of the slab, the unit is KJ/Kg° C.; $\lambda(t)$ indicates a thermal conductivity of the slab, the unit is KJ/Kg° C.

In a feasible implementation, the slab temperature prediction model is obtained. The slab temperature prediction model can calculate the temperature field distribution of the slab in the furnace in real-time until the slab is discharged from the furnace. The heating process of slab is complex, involving complex physical and chemical processes such as fuel combustion, gas flow, heat and mass transfer, etc. There are many limiting factors for slab heating, such as furnace size, thermal characteristics of furnace walls, slab size, thermal properties of slabs, types and heating amounts of fuels, preheating temperature and air fuel ratio of air and fuel, thermal characteristics of furnace gas, movement of furnace gas, and movement of slabs. It is difficult to detect the slab temperature. In order to accurately control the slab heating process and the temperature and uniformity of the outgoing furnace, it is necessary to predict the slab temperature rise process in the furnace, that is, use mathematical models to predict the temperature distribution of the slab at each time in the furnace.

At block S206, furnace temperature optimization model is established based on the slab temperature control equation.

Optically, the step S206 of establishing the furnace temperature optimization model includes:

S261, performing offline optimization, and establishing a basic furnace temperature table, namely a furnace temperature carpet map;

S262: performing online dynamic optimization, based on a heating process and production rhythm, simulating a temperature rise process of the slab, and calculating a necessary furnace temperature required by a target heating process;

S263, synthesizing the furnace temperature, giving different weight values to each slab based on online optimization of a furnace temperature of each slab. With the position of each slab in a furnace section and a target temperature being different, the weight value within each slab also being different.

In a feasible implementation, the premise of optimal control of furnace temperature is that the L1 level realizes the closed loop of furnace temperature, and the furnace temperature of each zone is dynamically adjusted by the model according to the steel type and specification of the slab in the furnace. The first step is to perform offline optimization, and establish the basic furnace temperature table, i.e., the furnace temperature carpet map. The optimal heating process and optimal furnace temperature are obtained through offline optimization by comprehensive consideration of steel type, slab thickness, width, finished product width, thickness, furnace charging temperature, target temperature, furnace time and other factors. The second step is to perform online dynamic optimization, and according to the heating process and production rhythm, simulate the heating process of the slab, and calculate the necessary furnace temperature required to achieve the target heating process. The furnace temperature is the furnace temperature required for each single slab to be heated. The third step is to synthesize the furnace temperature, give different weight values to each slab based on online optimization of a furnace temperature of each slab. With the position of each slab in a furnace section and a target temperature being different, the weight value within each slab also being different.

At block S207, the heating furnace combustion control system based on the mechanism model is integrated with the big data cloud platform, to complete the intelligent control of heating furnace combustion based on the big data cloud platform.

In a feasible implementation, in order to break through the bottleneck of the traditional heating furnace combustion control system, the mechanism model is integrated with knowledge decision-making base of the cloud platform big data to adapt to complex production conditions and changes in furnace conditions. The system sets the switch to control whether the big data expert knowledge base participates in online control.

In the implementation of the present disclosure, the mechanism model refers to the data-driven model. The mechanism model generally refers to the model established according to the traditional mechanism. The mechanism model in the embodiment of the present disclosure refers to the billet heating temperature field model.

The big data cloud platform establishes a synchronous data image in the heating furnace according to data collection information, continuously iteratively updates each knowledge decision-making database, synthesizes information of each knowledge base, and sends process and time control parameters to the furnace combustion control system in real time through an API function.

In embodiments of the present disclosure, by the method for intelligent control of heating furnace combustion based on a big data cloud platform provided by the present disclosure, a complete and independent relevant data knowledge base can be formed through artificial intelligence and big data technologies. Based on this knowledge base, the intelligent combustion model uses the mechanism model to calculate the optimal heating curve of the slab under current furnace conditions and working conditions, as well as the furnace temperature and even the air fuel ratio required to ensure the quality of the slab. It is then distributed to the original heating furnace system, thereby achieving intelligent control of heating furnace combustion.

```
The data structure of the slab in the furnace is as follows.
#define    FCEZONE_MAX 5 // number of furnace zones
#define    SLABNO_LEN 16 // String length of slab number
#define    SCHNUMBER_LEN 15 // string length of plan number
#define    STEELGRADE_LEN 24 // steel grade string length
#define    CUSTOMER_STEELGRADE_LEN 12 // customer steel grade string
length
#define    QUATYPE_LEN 20 // material classification length
struct SLAB_TRACK
{
   // basic information
   char      SlabNo[SLABNO_LEN + 1]; // slab number
   char      RPNo[SCHNUMBER_LEN + 1]; // plan number
   char      SteelGrade[STEELGRADE_LEN + 1]; // steel grade
   char      CustomerSteelGrade[STEELGRADE_LEN + 1]; // customer steel grade
   char         CUSTOM_SGC_UPD[STEELGRADE_LEN + 1]; // change the steel
grade
   int       Series; // steel series
   short     FCENo; // furnace number
   short     FCERow; // column number 0: long billet, 1: near rolling mill side, 2: far
rolling mill side
   int       Disch_Sequ; // serial number
   short     IsSingle; // Whether single or not 0: No 1: Yes
   long      RollSequ; // rolling sequence && plan number
   short     SlabPos; // slab position
   float     SlabExitDis; // Distance from the front of the slab to the exit door (the
exit side is the origin) [mm]
   float     SlabChargeDisX; // Distance from the rear edge of the slab to the furnace
door (the furnace side is the origin) [mm]
   float        DisFromWall; // distance between slab and side wall [mm] short
HearthDis; // long billet center position 0: center of furnace, 1: near rolling mill side,
2: far rolling mill side
   short     HeatSect; // The number of the heating section 1: heat recovery, 2:
preheating, 3: one plus, 4: two plus, 5: soaking
   short        HGFlag; // hot and cold billet flag 0: cold billet, 1: warm billet, 2: hot
billet
   // raw material data
   float     SlabLen; // slab length [mm]
   float     SlabWid; // slab width [mm]
   float     SlabThk; // slab thickness [mm]
   float     SlabWet; // Slab weight [ton]
   float     SlabTrgTemp; // Slab target temperature ['C]
     // finished product data
   float     CoilThk; // finished thickness
   float     CoilWid; // finished product width
   short     IsNarrow; // whether to narrow 0: not narrow 1: narrow
   short        SteelGradeType; // Steel grade classification 0: Common carbon 1:
Variety
   // team information
   short     Crew; // Group (1-A, 2-B, 3-C, 4-D) [--]
   short     Shift; // shift (1-morning, 2-middle, 3-night) [--]
   POS_INFO   SlabPosInfo; // Slab position tracking information
   TEMP_INFO  Slab TempInfo; // Slab temperature tracking information
   KNLDGE_BASE   KnldgeInfo; // big data knowledge decision base
information
```

```
STATISTIC_INFO    StatisticInfo; // Slab statistical information
}
//
// big data knowledge base
//
struct KNLDGE_BASE
{
  float  EndTempInZoneTrg[FCEZONE_MAX]; //outgoing board temperature
target ['C]
  float       AirFuelRatioTrg[FCEZONE_MAX]; //target air-fuel ratio of each stage
[--]
  float  FCETempUP[FCEZONE_MAX]; //furnace temperature of each section
(upper) ['C]
  float  FCETempDN[FCEZONE_MAX]; //furnace temperature of each section
(bottom) ['C]
  float  InZoneTime[FCEZONE_MAX]; // in zone time [min]
```

In embodiments of the present disclosure, by the method for intelligent control of heating furnace combustion based on a big data cloud platform provided by the present disclosure, a complete and independent relevant data knowledge base can be formed through artificial intelligence and big data technologies. Based on this knowledge base, the intelligent combustion model uses the mechanism model to calculate the optimal heating curve of the slab under current furnace conditions and working conditions, as well as the furnace temperature and even the air fuel ratio required to ensure the quality of the slab. It is then distributed to the original heating furnace system, thereby achieving intelligent control of heating furnace combustion.

Figure 12:
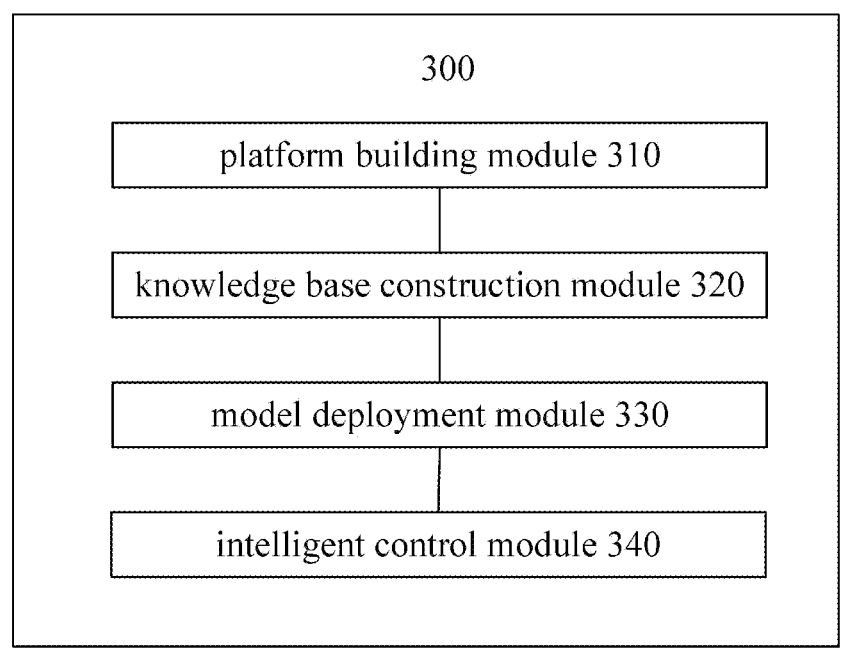
FIG. 12 is a schematic diagram illustrating a device for intelligent control of heating furnace combustion based on a big data cloud platform according to an embodiment of the present disclosure.

FIG. 12 is a schematic diagram illustrating a device for intelligent control of heating furnace combustion based on a big data cloud platform according to an embodiment of the present disclosure.

Referring to FIG. 12, the device 300 includes:
a platform building module 310, configured to build the big data cloud platform based on production and operation parameters of a heating furnace;
a knowledge base construction module 320, configured to identify and analyze key factors in a production process of the heating furnace, by using big data mining technology, based on the big data cloud platform, to obtain a relevant data knowledge base and a big data decision-making knowledge base;
a model deployment module 330, configured to deploy independently a heating furnace combustion control system based on a mechanism model;
an intelligent control module 340, configured to integrate the heating furnace combustion control system based on the mechanism model with the big data cloud platform, and complete the intelligent control of heating furnace combustion based on the big data cloud platform.

Optically, the platform building module 310 is configured to design hardware equipment, parameters, and division of labor of the big data cloud platform based on analysis of data storage, access concurrency, heating furnace expert knowledge base, and factors related to calculation demand in a process of model base research and development.

The big data cloud platform adopts a three-layer architecture, with a bottom layer being an infrastructure layer, a middle layer being a support layer, and a top layer being a knowledge base service layer.

Optically, the infrastructure layer of the big data cloud platform is configured for hardware resource virtualization and management services, the support layer of the big data cloud platform is configured to provide support for collection, storage, mining, analysis, and visual research and development of parameters during operation of the production process of the heating furnace, the knowledge base service layer is configured to store the key factors of the production process of the heating furnace.

Optically, the knowledge base construction module 320 is configured to:
identify the key factors in the production process of the heating furnace, by using the big data mining technology, based on the big data cloud platform, to obtain the relevant data knowledge base;
mine an association map of each operating parameter, by intelligent analysis of big data, based on artificial intelligence, machine learning and mode learning methods preset by a parameter data center during operation of the heating furnace, to obtain the big data decision-making knowledge base.

Optically, the knowledge base construction module 320 is configured to:
obtain a knowledge base of working and furnace conditions, including: for different planned mixed assembly, according to different heating sections, and based on steel type, position weight, vacancy layout, target temperature, current temperature, predicted section temperature, weighing a heating system of different slabs, and perceiving furnace and working condition state parameters of the heating furnace for overall planning, to obtain the knowledge base of working and furnace conditions;
obtain an accuracy evaluation knowledge base for a plate temperature prediction model, including: dynamically evaluating prediction accuracy data of a temperature inside a furnace of each grade for adaptive adjustment of an intelligent combustion model, and synthesizing the prediction accuracy data to obtain the accuracy evaluation knowledge base for the plate temperature prediction model;
obtain a knowledge base for energy efficiency evaluation of the heating furnace, including: based on production data, energy data and furnace conditions, forming objective evaluation data of the heating furnace, and synthesizing the objective evaluation data to obtain the knowledge base for energy efficiency evaluation of the heating furnace;
obtain a knowledge base for furnace pressure discrimination, including: according to a standard that a priority of furnace pressure control is higher than that of furnace temperature control, controlling an outlet side of the heating furnace to be in a micro-positive pressure state, and synthesizing control standard data and micro-positive pressure state data, to obtain the knowledge base for furnace pressure discrimination;

obtain a knowledge base for air-fuel ratio optimization, including: setting a reasonable air-fuel ratio, determining a control accuracy of furnace temperature and a control accuracy of atmosphere in each heating section, to obtain the knowledge base for air-fuel ratio optimization.

Optically, the knowledge base construction module 320 is configured to:

obtain a heating target decision-making knowledge base, including: describing a heating target specified by each heating furnace through a furnace outlet temperature and a RDT, to obtain the heating target decision-making knowledge base;

obtain a heating system decision-making knowledge base, including: making statistics on heating curves under various working conditions, and obtaining the heating system decision-making knowledge base.

Optically, the model deployment module 330 is configured to:

track and correct material of the heating furnace, corresponding a rolling plan with an actual slab one by one, determine a tracking position, and traverse a slab flow direction, and make tracking correction;

predict a temperature rise process of the slab in the heating furnace, and predict a temperature distribution of the slab at each time section in the heating furnace by using a mathematical model, a slab temperature control equation is shown in formula (1):

$$\rho(t)Cp(t)\frac{\partial t}{\partial \tau} = \frac{\partial}{\partial x}\left[\lambda(t)\frac{\partial t}{\partial x}\right] + \frac{\partial}{\partial y}\left[\lambda(t)\frac{\partial t}{\partial y}\right] \quad (1)$$

in which $\rho(t)$ indicates a density of the slab; $Cp(t)$ indicates a specific heat of the slab; $\lambda(t)$ indicates a thermal conductivity of the slab;

establish a furnace temperature optimization model based on the slab temperature control equation.

Optically, the model deployment module 330 is configured to:

perform offline optimization based on the slab temperature control equation, and establish a basic furnace temperature table, namely a furnace temperature carpet map;

perform online dynamic optimization based on the slab temperature control equation, based on a heating process and production rhythm, simulate a temperature rise process of the slab, and calculate a necessary furnace temperature required by a target heating process;

synthesize the furnace temperature, give different weight values to each slab, and obtain the furnace temperature optimization model based on online optimization of a furnace temperature of each slab, in which with a position of each slab in a furnace section and a target temperature being different, the weight value within each slab also being different.

Optically, the intelligent control module 340 is configured to integrate the heating furnace combustion control system based on the mechanism model with the big data cloud platform, the big data cloud platform establishing a synchronous data image in the heating furnace according to data collection information, continuously iteratively updating each knowledge decision-making database, synthesizing information of each knowledge base, and sending process and time control parameters to the furnace combustion control system in real time through an API function, and completing the intelligent control of heating furnace combustion based on the big data cloud platform.

In embodiments of the present disclosure, by the method for intelligent control of heating furnace combustion based on a big data cloud platform provided by the present disclosure, a complete and independent relevant data knowledge base can be formed through artificial intelligence and big data technologies. Based on this knowledge base, the intelligent combustion model uses the mechanism model to calculate the optimal heating curve of the slab under current furnace conditions and working conditions, as well as the furnace temperature and even the air fuel ratio required to ensure the quality of the slab. It is then distributed to the original heating furnace system, thereby achieving intelligent control of heating furnace combustion.

Figure 13:
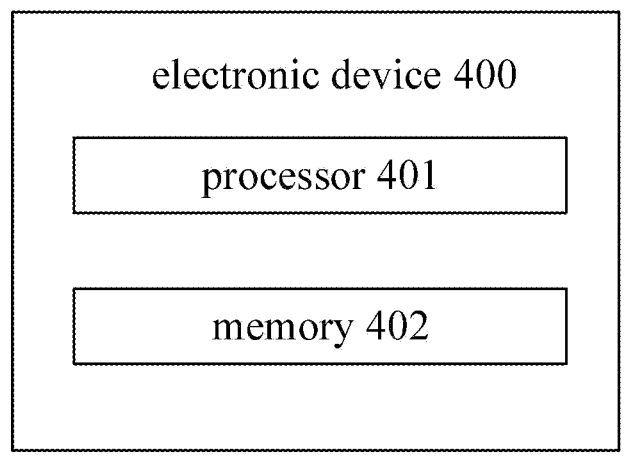
FIG. 13 is a schematic diagram illustrating an electronic device according to an embodiment of the present disclosure.

FIG. 13 is a schematic diagram illustrating an electronic device 400 according to an embodiment of the present disclosure. The electronic device 400 may vary significantly due to different configurations or performance, and may include one or more central processing units (CPUs) 401 and one or more memory 402. At least one instruction is stored in the memory 402, and the at least one instruction can be loaded and executed by the processor 401 to realize the method for intelligent control of heating furnace combustion based on a big data cloud platform, including:

S1: building the big data cloud platform based on production and operation parameters of a heating furnace;

S2: identifying and analyzing key factors in a production process of the heating furnace, by using big data mining technology, based on the big data cloud platform, to obtain a relevant data knowledge base and a big data decision-making knowledge base;

S3: deploying independently a heating furnace combustion control system based on a mechanism model;

S4: integrating the heating furnace combustion control system based on the mechanism model with the big data cloud platform, and completing the intelligent control of heating furnace combustion based on the big data cloud platform.

In the exemplary embodiment, a computer-readable storage medium is also provided, such as a memory including instructions, which can be executed by a processor in the terminal to complete the method intelligent control of heating furnace combustion based on a big data cloud platform. For example, the computer-readable storage medium can be Read-Only Memory (ROM), Random-Access Memory (RAM), Compact Disc Read-Only Memory (CD-ROM), magnetic tape, floppy disk, optical data storage device, etc.

Those skilled in the art can understand that all or part of the steps to implement the above embodiments can be completed through hardware, or by instructing relevant hardware through programs. The programs can be stored in a computer-readable storage medium, which can be read-only memory, magnetic disk, or optical disk, etc.

What is claimed is:

1. A method for intelligent control of heating furnace combustion based on a big data cloud platform, comprising:

S1: building the big data cloud platform based on production and operation parameters of a heating furnace;

S2: identifying and analyzing key factors in a production process of the heating furnace, by using big data mining technology, based on the big data cloud platform, to obtain a relevant data knowledge base and a big data decision-making knowledge base;

wherein step S2 of identifying and analyzing the key factors in the production process of the heating furnace, by using the big data mining technology, based on the big data cloud platform, to obtain the relevant data knowledge base and the big data decision-making knowledge base comprises:

S21: identifying the key factors in the production process of the heating furnace, by using big data mining technology, based on the big data cloud platform, to obtain the relevant data knowledge base;

S22: mining an association map of each operating parameter, by intelligent analysis of big data, based on artificial intelligence, machine learning and mode learning methods preset by a parameter data center during operation of the heating furnace, to obtain the big data decision-making knowledge base;

wherein step S21 of obtaining the relevant data knowledge base comprises:

obtaining a knowledge base of working and furnace conditions, comprising: for different planned mixed assembly, according to different heating sections, and based on steel type, position weight, vacancy layout, target temperature, current temperature, predicted section temperature, weighing a heating system of different slabs, and perceiving furnace and working condition state parameters of the heating furnace for overall planning, to obtain the knowledge base of working and furnace conditions;

obtaining an accuracy evaluation knowledge base for a plate temperature prediction model, comprising: dynamically evaluating prediction accuracy data of a temperature inside a furnace of each grade for adaptive adjustment of an intelligent combustion model, and synthesizing the prediction accuracy data to obtain the accuracy evaluation knowledge base for the plate temperature prediction model;

obtaining a knowledge base for energy efficiency evaluation of the heating furnace, comprising: based on production data, energy data and furnace conditions, forming objective evaluation data of the heating furnace, and synthesizing the objective evaluation data to obtain the knowledge base for energy efficiency evaluation of the heating furnace;

obtaining a knowledge base for furnace pressure discrimination, comprising: according to a standard that a priority of furnace pressure control is higher than that of furnace temperature control, controlling an outlet side of the heating furnace to be in a micro-positive pressure state, and synthesizing control standard data and micro-positive pressure state data, to obtain the knowledge base for furnace pressure discrimination;

obtaining a knowledge base for air-fuel ratio optimization, comprising: setting a reasonable air-fuel ratio, determining a control accuracy of furnace temperature and a control accuracy of atmosphere in each heating section, to obtain the knowledge base for air-fuel ratio optimization;

wherein step S22 of obtaining the big data decision-making knowledge base comprises:

obtaining a heating target decision-making knowledge base, comprising: describing a heating target specified by each heating furnace through a furnace outlet temperature and a Rolling Delivery Temperature (RDT), to obtain the heating target decision-making knowledge base;

obtaining a heating system decision-making knowledge base, comprising: making statistics on heating curves under various working conditions, and obtaining the heating system decision-making knowledge base;

S3: deploying independently a heating furnace combustion control system based on a mechanism model;

S4: integrating the heating furnace combustion control system based on the mechanism model with the big data cloud platform, and completing the intelligent control of heating furnace combustion based on the big data cloud platform;

wherein step S4 of integrating the heating furnace combustion control system based on the mechanism model with the big data cloud platform, and completing the intelligent control of heating furnace combustion based on the big data cloud platform comprises:

integrating the heating furnace combustion control system based on the mechanism model with the big data cloud platform, the big data cloud platform establishing a synchronous data image in the heating furnace according to data collection information, continuously iteratively updating the relevant data knowledge base and the big data decision-making knowledge base, synthesizing information of the relevant data knowledge base and the big data decision-making knowledge base, and sending process and time control parameters to the furnace combustion control system in real time through an Application Programming Interface (API) function, and completing the intelligent control of heating furnace combustion based on the big data cloud platform.

2. The method according to claim 1, wherein step S1 of building the big data cloud platform based on the production and operation parameters of the heating furnace comprises:

designing hardware equipment, parameters, and division of labor of the big data cloud platform based on analysis of data storage, access concurrency, heating furnace expert knowledge base, and factors related to calculation demand in a process of model base research and development;

wherein the big data cloud platform adopts a three-layer architecture, with a bottom layer being an infrastructure layer, a middle layer being a support layer, and a top layer being a knowledge base service layer.

3. The method according to claim 2, wherein the infrastructure layer of the big data cloud platform is configured for hardware resource virtualization and management services, the support layer of the big data cloud platform is configured to provide support for collection, storage, mining, analysis, and visual research and development of parameters during operation of the production process of the heating furnace, the knowledge base service layer is configured to store the key factors of the production process of the heating furnace.

4. The method according to claim 1, wherein step S3 of deploying independently the heating furnace combustion control system based on the mechanism model comprises:

S31: tracking and correcting material of the heating furnace, corresponding a rolling plan with an actual slab one by one, determining a tracking position, and traversing a slab flow direction, and making tracking correction;

S32: predicting a temperature rise process of the slab in the heating furnace, and predicting a temperature distribution of the slab at each time section in the heating furnace by using a mathematical model, wherein a slab temperature control equation is shown in formula (1):

$$\rho(t)Cp(t)\frac{\partial t}{\partial \tau} = \frac{\partial}{\partial x}\left[\lambda(t)\frac{\partial t}{\partial x}\right] + \frac{\partial}{\partial y}\left[\lambda(t)\frac{\partial t}{\partial y}\right] \quad (1)$$

wherein ρ(t) indicates a density of the slab; Cp(t) indicates a specific heat of the slab; λ(t) indicates a thermal conductivity of the slab;

S33: establishing a furnace temperature optimization model based on the slab temperature control equation.

5. The method according to claim 4, wherein step S33 of establishing the furnace temperature optimization model based on the slab temperature control equation comprises:

S331: performing offline optimization based on the slab temperature control equation, and establishing a basic furnace temperature table, namely a furnace temperature carpet map;

S332: performing online dynamic optimization based on the slab temperature control equation, based on a heating process and production rhythm, simulating a temperature rise process of the slab, and calculating a necessary furnace temperature required by a target heating process;

S333: synthesizing the furnace temperature, giving different weight values to each slab, and obtaining the furnace temperature optimization model based on online optimization of a furnace temperature of each slab, wherein with a position of each slab in a furnace section and a target temperature being different, the weight value within each slab also being different.

6. A device for intelligent control of heating furnace combustion based on a big data cloud platform, wherein the device is applicable to the method according to claim 1, and comprises:

a platform building module, configured to build the big data cloud platform based on production and operation parameters of a heating furnace;

a knowledge base construction module, configured to identify and analyze key factors in a production process of the heating furnace, by using big data mining technology, based on the big data cloud platform, to obtain a relevant data knowledge base and a big data decision-making knowledge base;

a model deployment module, configured to deploy independently a heating furnace combustion control system based on a mechanism model;

an intelligent control module, configured to integrate the heating furnace combustion control system based on the mechanism model with the big data cloud platform, and complete the intelligent control of heating furnace combustion based on the big data cloud platform.

* * * * *